(12) United States Patent
Nathan et al.

(10) Patent No.: US 8,686,940 B2
(45) Date of Patent: Apr. 1, 2014

(54) HAPTIC ALERT WAVEFORM GENERATION METHOD AND SYSTEM

(75) Inventors: John F. Nathan, Highland Township, MI (US); Karl Kennedy, Fraser, MI (US); Santosh Karumathil, Thane (IN)

(73) Assignee: Lear Corporation, Southfield, MI (US)

( * ) Notice: Subject to any disclaimer, the term of this patent is extended or adjusted under 35 U.S.C. 154(b) by 654 days.

(21) Appl. No.: 12/921,601

(22) PCT Filed: Feb. 27, 2009

(86) PCT No.: PCT/US2009/035449
§ 371 (c)(1),
(2), (4) Date: Sep. 9, 2010

(87) PCT Pub. No.: WO2009/134525
PCT Pub. Date: Nov. 5, 2009

(65) Prior Publication Data
US 2011/0001616 A1 Jan. 6, 2011

Related U.S. Application Data

(60) Provisional application No. 61/048,218, filed on Apr. 30, 2008.

(51) Int. Cl.
*G09G 5/00* (2006.01)
*G06F 3/00* (2006.01)

(52) U.S. Cl.
USPC .............................. 345/156; 715/703; 701/45

(58) Field of Classification Search
USPC .................................................. 345/156, 7–9
See application file for complete search history.

(56) References Cited

U.S. PATENT DOCUMENTS

| 7,209,117 | B2 * | 4/2007 | Rosenberg et al. ........... 345/156 |
| 7,218,310 | B2 * | 5/2007 | Tierling et al. ............... 345/156 |
| 7,228,212 | B2 | 6/2007 | Hijikata et al. |
| 7,258,190 | B2 | 8/2007 | Mattes et al. |
| 7,280,046 | B2 | 10/2007 | Berg et al. |
| 7,327,234 | B2 | 2/2008 | Egami et al. |
| 7,359,782 | B2 * | 4/2008 | Breed ............................. 701/45 |
| 2003/0229447 | A1 | 12/2003 | Wheatley et al. |
| 2004/0049323 | A1 * | 3/2004 | Tijerina et al. ..................... 701/1 |
| 2005/0192727 | A1 | 9/2005 | Shostak et al. |
| 2005/0258977 | A1 | 11/2005 | Kiefer et al. |
| 2005/0273263 | A1 | 12/2005 | Egami et al. |

(Continued)

FOREIGN PATENT DOCUMENTS

DE 10202952 A1 8/2003

OTHER PUBLICATIONS

International Preliminary Report on Patentability for corresponding Application No. PCT/US09/35449, mailed Nov. 12, 2010, 5 pages.

(Continued)

*Primary Examiner* — Duc Dinh
(74) *Attorney, Agent, or Firm* — Brooks Kushman P.C.

(57) ABSTRACT

Haptic alert waveform generation method and system for use with haptic actuators that impart haptic sensations according to a waveform of an input signal used to control the haptic actuator. The shape and/or amplitude of the waveform may be controlled according to information collected from various vehicle systems, allowing virtually any type of waveform to generate and used to impart virtually any type of haptic sensations.

3 Claims, 5 Drawing Sheets

(56) References Cited

U.S. PATENT DOCUMENTS

| | | |
|---|---|---|
| 2005/0275508 A1 | 12/2005 | Orr et al. |
| 2006/0009886 A1 | 1/2006 | Sakurai et al. |
| 2006/0131093 A1 | 6/2006 | Egami |
| 2007/0008083 A1 | 1/2007 | Berg et al. |
| 2007/0129861 A1 | 6/2007 | Hashiba et al. |
| 2007/0241595 A1 | 10/2007 | Nathan et al. |
| 2008/0046150 A1 | 2/2008 | Breed |
| 2008/0055055 A1 | 3/2008 | Powell et al. |

OTHER PUBLICATIONS

German Office Action for corresponding Application No. 11 2009 001 029.6, mailed Jun. 9, 2011, 12 pages.

International Search Report for corresponding Application No. PCT/US09/35449, mailed Apr. 14, 2009, 9 pages.

* cited by examiner

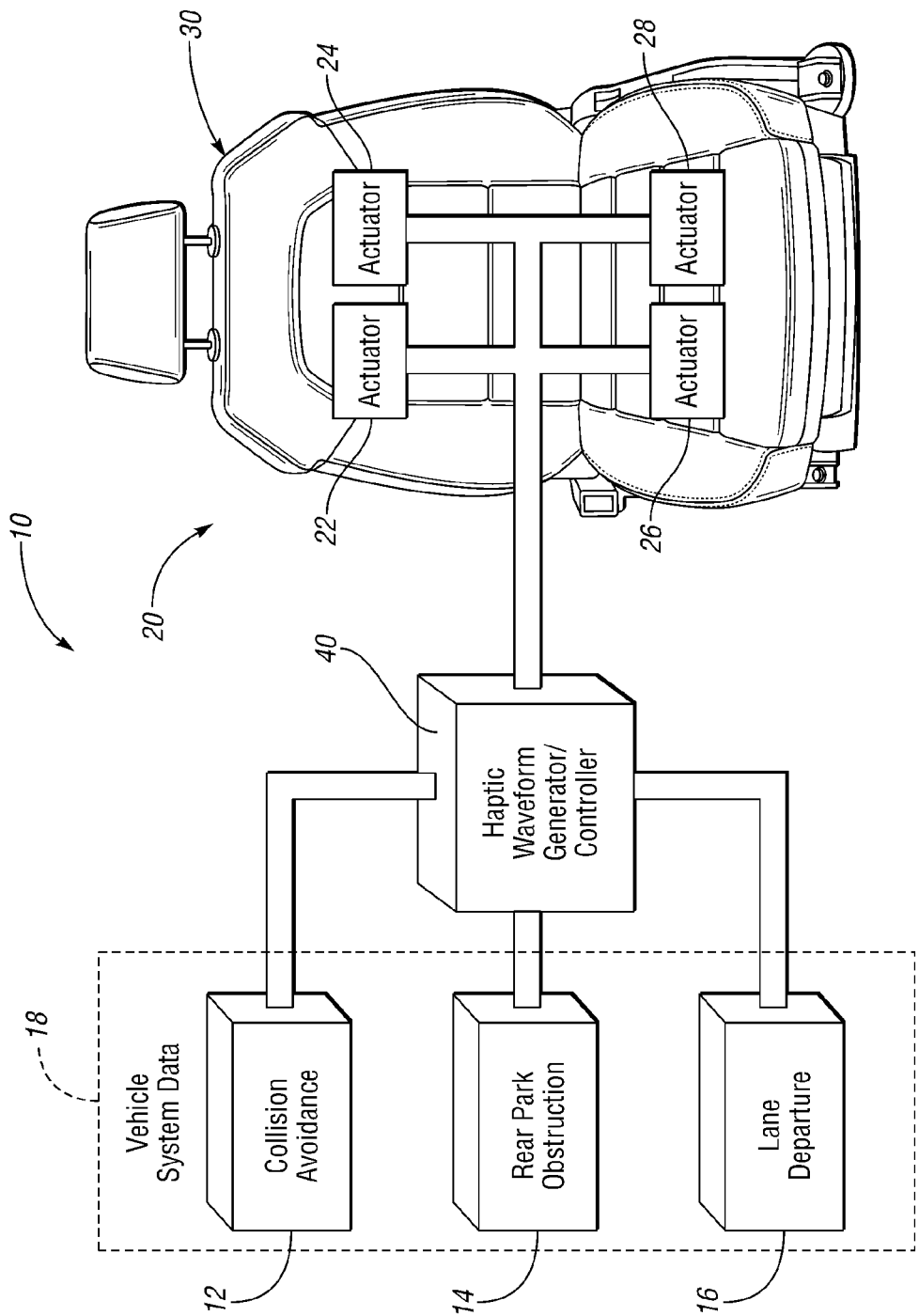

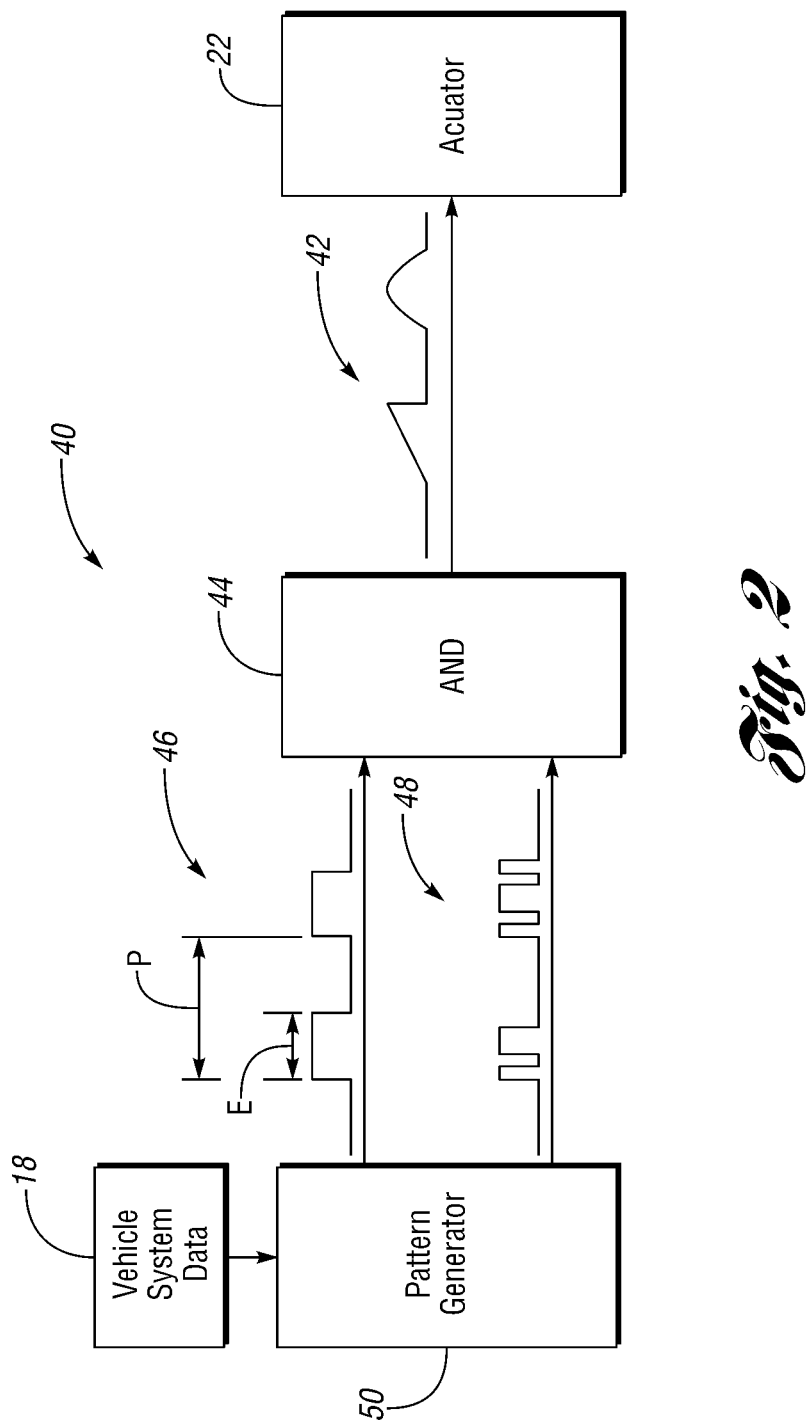

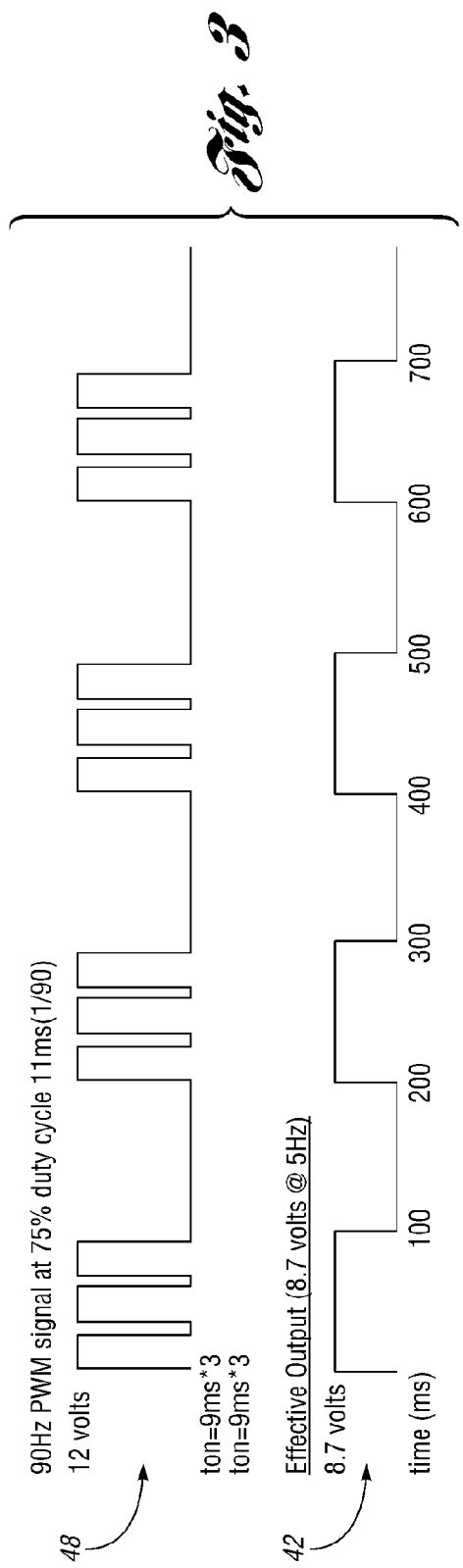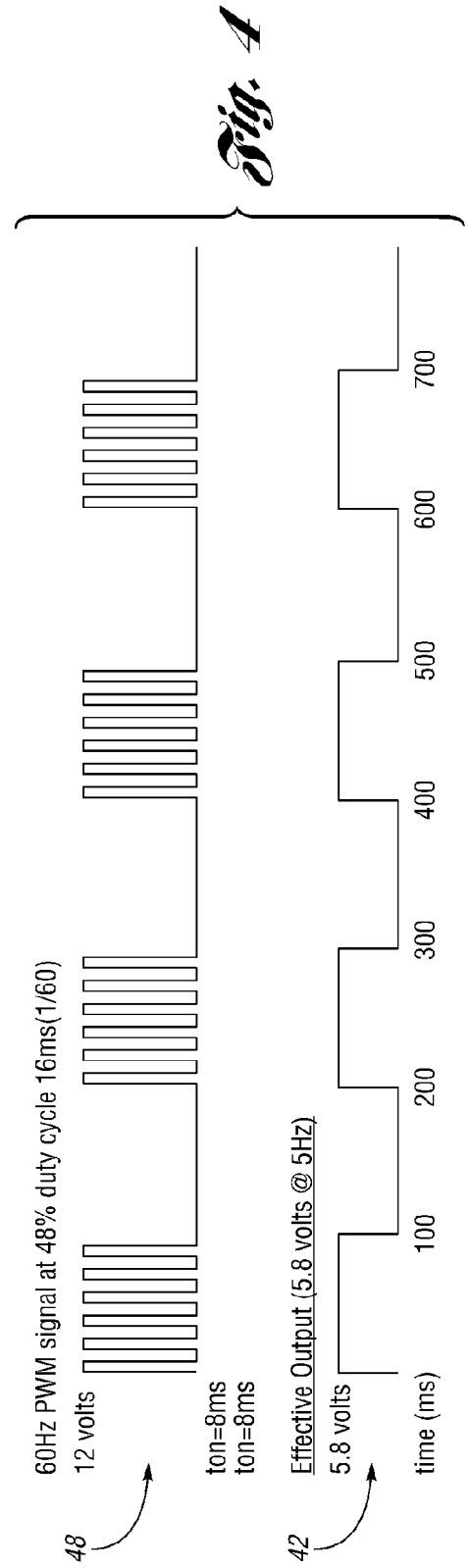

HAPTIC ALERT WAVEFORM GENERATION METHOD AND SYSTEM

CROSS-REFERENCE TO RELATED APPLICATION

This application is a 371 of PCT International Application No. PCT/US2009/035449, filed Feb. 27, 2009, which claims the benefit of U.S. provisional application Ser. No. 61/049,218 filed Apr. 30, 2008.

BACKGROUND OF THE INVENTION

1. Field of the Invention

The present invention relates to haptic seating system of the type where haptic, alerting sensations are varied as a function of a triggering event.

2. Background Art

Some seating systems, such as but not limited to those commonly employed in vehicle seats, may include a haptic element. The haptic element may be any device that can be controlled to provide a haptic or tactile sensation to a seat occupant. One type of haptic element may include an electric motor to rotate or otherwise drive an eccentrically loaded weight or other feature in a manner sufficient to induce a haptic sensation. The haptic sensation may result from the eccentrically driven weight inducing a vibration, shockwave, or other force within a seat cushion, against a seat frame/structure, or through another mechanism.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

FIG. 1 illustrates a haptic seating system in accordance with one non-limiting aspect of the present invention;

FIG. 2 illustrates operation of a haptic waveform generator in accordance with one non-limiting aspect of the present invention; and FIGS. 3-7 illustrate waveform controls in accordance with one non-limiting aspect of the present invention.

DETAILED DESCRIPTION OF THE PREFERRED EMBODIMENT(S)

Figure 5:
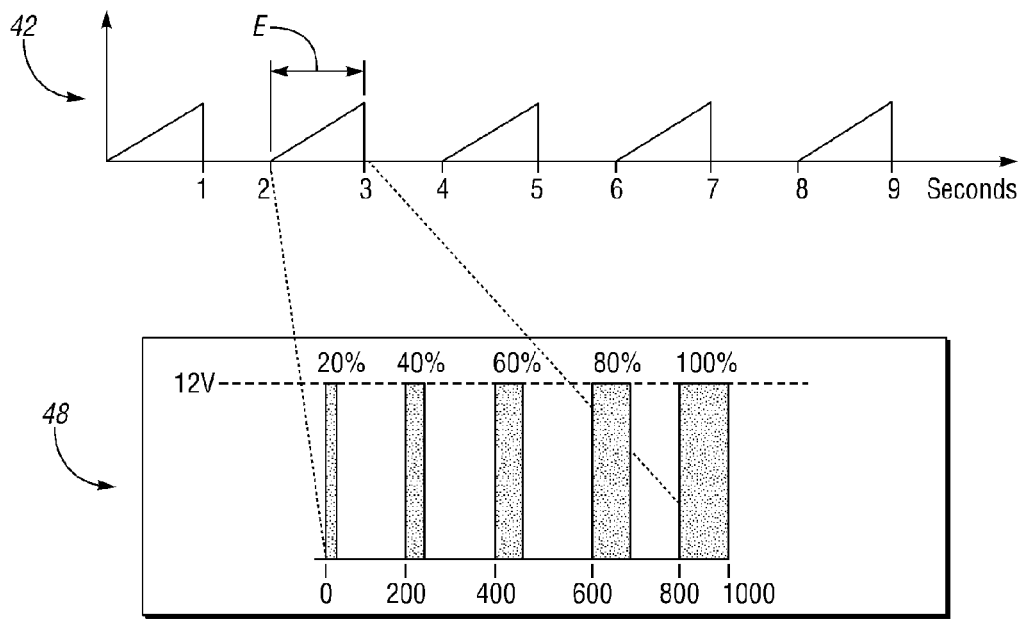

FIG. 1 illustrates a haptic seating system 10 in accordance with one non-limiting aspect of the present invention. The system 10 may be configured to integrate any number of vehicle systems 12, 14, 16 with a haptic system 20 having one or more haptic actuators 22, 24, 26, 28 included within one or more seats 30 of a vehicle (not shown). One type of haptic actuator 22, 24, 26, 28 may include an electric motor that is configured to rotate or otherwise drive an eccentrically loaded weight or other feature. The haptic sensation may result from the eccentrically driven weight inducing a vibration, shockwave, or other force within a seat cushion, against a seat frame/structure, or through another mechanism.

The integration of the vehicle systems 12, 14, 16 and haptic system 20 may be achieved by coordinating the sensation imparted by the haptic actuators 22, 24, 26, 28 as a function of vehicle system data 18 collected from the vehicle systems 12, 14, 16, and/or drivers associated therewith. For exemplary purposes, the haptic system 20 is shown with respect to a single seat having actuators controlled by one or more of a collision avoidance system 12, park obstruction system 14, and lane departure system 16. The operation, status, events, alerts, or other triggers, states, or parameters sensed, monitored, and/or determined from these or other non-illustrated vehicle systems may be used to activate the haptic actuators 22, 24, 26, 28 to induce any type of sensation to the seat occupant.

Each of the vehicle systems 12, 14, 16 may independently or collectively communicate directly or indirectly with haptic actuators 22, 24, 26, 28 included on to any seat within the vehicle. The drivers may communicate with a vehicle system controller (not shown) that interacts with each of the vehicle systems 12, 14, 16 and/or the drivers may communicate directly with one or more of the vehicle systems. In this manner, the conditions sensed or otherwise determined from the vehicle data 18, may be used to facilitate imparting a related haptic sensation to the respective seat occupant. Likewise, individuals may be associated with particular vehicle seats so that the haptic sensations generated in response to the collected information can be tailored to the particular seat occupant.

The system 10 may include a haptic waveform generator 40 in accordance with one non-limiting aspect of the present invention. The haptic waveform generator 40 may be configured to control each of the haptic elements 22, 24, 26, 28 to generate a unique sensation depending on information received from one or more of the vehicle systems 12, 14, 16. This may include controlling the sensation according to information received from the line departure system 16 that determines if the vehicle is veering from an desired driving lane, the rear park obstruction system 14 that determines if the vehicle is backing/approaching an obstruction, the collision avoidance system 12 that monitors other traffic/obstructions for possible collision, and/or any number of other cognitive vehicle system drivers.

Any particular vehicle safety system diagnostics may be used to collect additional information for use in assessing the need for various haptic alerts. These vehicle safety systems may include but are not limited those that provide information relevant to adaptive cruise controls, massage control, stability control, antilock braking control, reverse backing controls, collision warning controls, body control. This and any other type of information collected by systems within the vehicle may be used to assess certain vehicle conditions that may indicate triggering events suitable to a haptic sensations.

As describe above, one non-limiting aspect of the present invention relates to imparting haptic sensations to vehicle occupants with haptic actuators 22, 24, 26, 28 included within vehicle seats. The present invention, however, is not intended to be limited to any particular method of imparting the haptic sensations, i.e., the present invention is not intended to be limited to seat imparted sensations. Other mechanisms may be similarly used to impart the sensations without deviating from the scope and contemplation of the present invention. Another non-limiting aspect of the present invention contemplates varying the haptic sensation depending on information received from one or more vehicles systems, sensors, monitors, etc.

The ability to vary the haptic sensation according to any vehicle operating condition or parameter allows the system to vary the haptic sensations in a manner that can be understood and/or learned by the seat occupant. The same seat may include a number of haptic actuators 22, 24, 26, 28 that can be controlled to impart the same or different sensations. These sensations can be controlled in any manner to induce different sensations depending on the vehicle operation. This can be helpful in generating one type of alert for an impending collision, generating another type of alert when veering into another lane, generating another type of alert when a door opens, etc. The number of alerts and the variability, duration, intensity, and other features and context of the alerts are unlimited.

FIG. 2 functionally illustrates operation of the haptic waveform generator 40 used to facilitate imparting the various haptic sensations. The haptic waveform generator 40 may be configured to separately or collectively output a time varying and waveform varying control/power signal to each of the haptic actuators 22, 24, 26, 28 that controls its operation and the resulting haptic sensation. The control signal, or more particularly its waveform, may be varied to control the type of sensation imparted by the actuator 22. The use of the control signal is predominately described with respect to controlling operation of an electric motor used to rotate an eccentric weight but any type of haptic element may be similarly controlled. The motor may be a DC type permanent magnet that rotates at particular intensity according to an inputted voltage level.

The waveform generator 40 may be configured to output an equivalent signal 42 to the motor 22 for controlling the intensity of the imparted sensation by controlling a revolution speed of the eccentrically loaded weight. The equivalent signal 42 may correspond with a signal outputted from a logical circuit (e.g., AND gate (multiple circuit) or OR gate (e.g., adds circuit) or other mechanism 44 of the generator having sufficient capabilities for combining a carrier signal 46 and a masking signal 48 outputted from a pattern generator 50. The pattern generator 50 may output the carrier and masking signals 46, 48 as a function of vehicle systems data 18 received from one or more of the above described vehicle systems 12, 14, 16.

The carrier signal 46 may be generated at a selected frequency and voltage to provide power sufficient for driving the electric motor 22. As shown, the carrier signal amplitude corresponds with a maximum desired driving voltage for the particular motor being driven. The duty cycle of the carrier signal 46 may be selected depending on desired operating parameters of the haptic system or the event triggering the haptic alert. Optionally, the carrier signal frequency and amplitude may be fixed so that the same carrier signal is continuously outputted in order to continuously provide a signal having a fixed voltage and frequency. If the carrier signal 46 were to pass directly to the motor without being combined with the masking signal 48, the motor would rotate at its maximum desired speed/intensity for a duration of an event period E when the carrier signal 46 is in its high state, which would vary according to the frequency of its duty cycle.

The masking signal 48 may be generated in a manner similar to the carrier signal 46 in that its amplitude and frequency can be controlled according to any number of desired operating conditions or triggering events. In accordance with one non-limiting aspect of the present invention, the carrier and masking signals 46, 48 may be generated to having a square waveform and at differing duty cycles. As shown, the duty cycle for the masking signal 48 is greater than the carrier signal 46 for a period P such that the equivalent signal 42 has a ramped waveform. This waveform may be controlled by varying the duty cycle of the masking signal 48 relative to the carrier wave 46. The variation of the masking signal 48 can be controlled through software or other logical processes without having to make corresponding hardware adjustments.

The use of the two square wave signals (carrier and masking signals 46, 48) to generate the variable waveform control signal (equivalent signal 42) allows the present invention to generate a signal with less complexity and costly circuitry than that which would be required with a device configured to simply output the equivalent signal 42. In particular, the pattern generator 50 may be a pulse-width-modulator (PWM) that produces less interference, requires less microprocessing, and less logical control than a system that simply outputs the equivalent signal.

Of course, the present invention is not intended to be limited to the described PWM signal combination systems and fully contemplates the use of other arrangements, including these that rely on non-square waveforms to produce other square or non-square waveforms. One other arrangement may include the use of variable power supply or other element that can manipulate the 12-14V power supplied from a vehicle battery into the above described equivalent signal 42. The present invention, however, does recognize that such an arrangement may 'choke' or otherwise over power a type of motor typically used in haptic seating systems. Such an arrangement would attempt to drive the motor with too small or too large of a control voltage.

FIGS. 3 and 4 illustrate intensity controls that can be provided by combining the carrier and masking signals 46, 48 in accordance with one non-limiting aspect of the present invention. FIG. 3 illustrates a condition where the carrier signal (not shown) is high for 100 ms at 12V and low for 100 ms at 0V while being ANDed with the masking signal 48 having a duty cycle of 75%. The resulting effective voltage of the equivalent signal 42 during the 100 ms that the carrier signal is high becomes 8.7V or 75% of the carrier signal 12V. FIG. 4 illustrates a similar process when the masking signal 48 is set to a 48% duty cycle in order to generate the equivalent signal 42 at and effective 5.8V. The ability to simply vary the masking signal 48 while generating the carrier signal 46 at a constant duty cycle allows the present invention to control the intensity of the haptic sensation.

Figure 6:
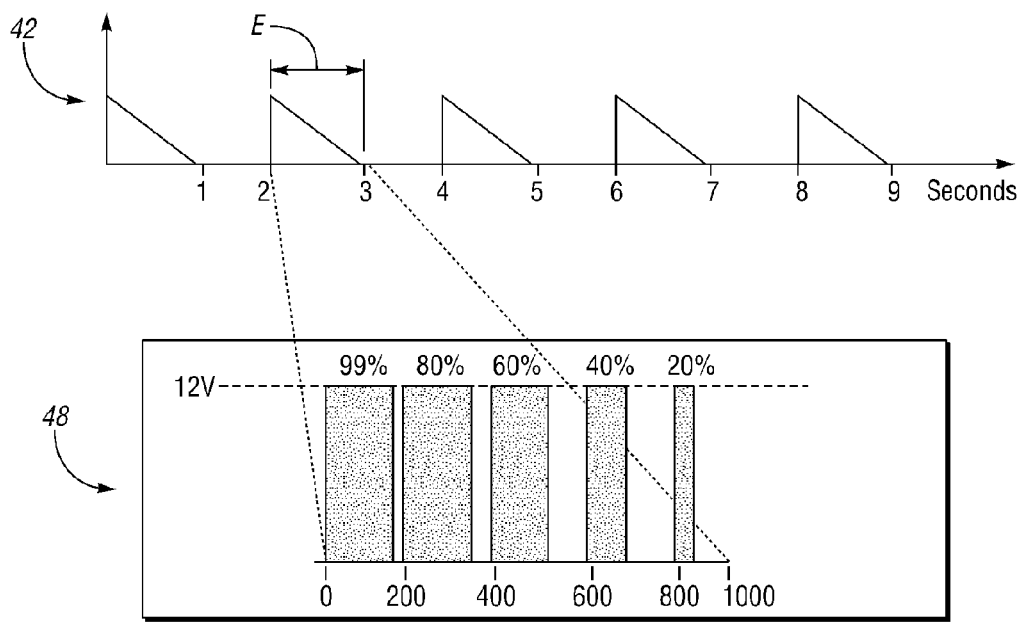
Figure 7:
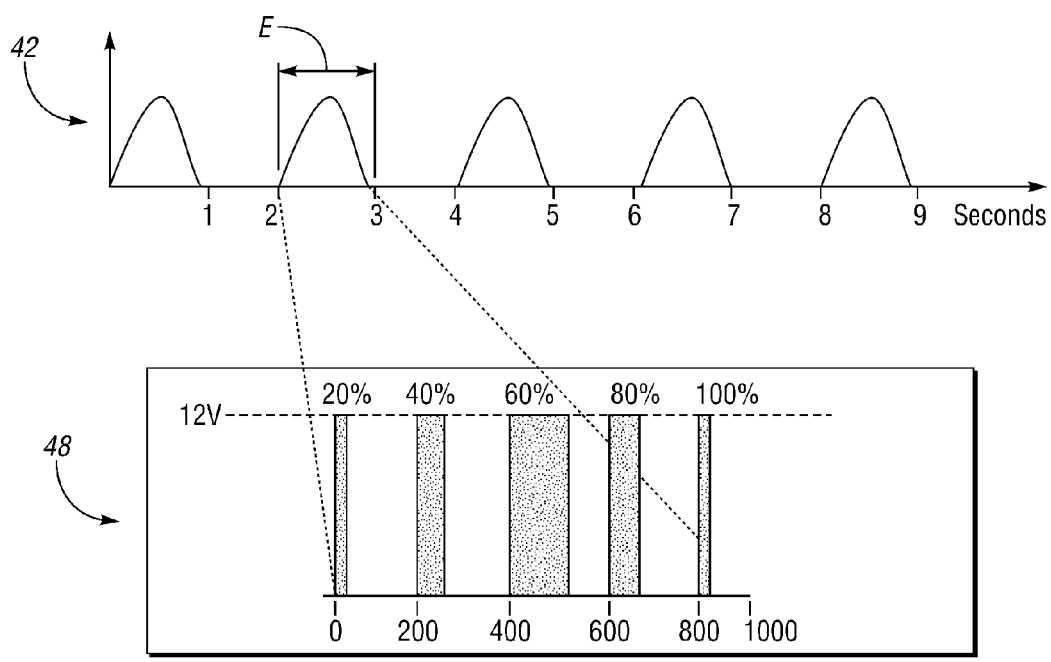

As shown, the equivalent signal waveform resulting from the duty cycles set in FIGS. 3 and 4 has a square waveform. The signal is square because the duty cycle of the masking signal 48 is constant through the event period E during which the carrier signal 46 is high. In this arrangement, the masking signal 48 is only being used to adjust the intensity of the haptic sensation experience by the occupant since the force generated by the motor is constant for each high period of the masking signal 48. FIGS. 5-7 illustrate various methods that can be used to adjust the shape of the equivalent signal waveform, and thereby, the sensation felt by the occupant during the event period E.

The shape of the equivalent signal waveform can be varied by varying the duty cycle of the masking signal 48 during the event period E. FIGS. 5-7 illustrate the duty cycle of the masking signal being varied during the event period E in order to produce an increasing ramp waveform (FIG. 5), a decreasing ramp waveform (FIG. 6), and a sinusoidal waveform (FIG. 7). The increasing/decreasing ramp waveforms are created by successively increasing/decreasing the masking signal duty cycle at increments of 20% throughout one event period (other increments could be used). The sinusoidal ramp waveform is created by initially increasing the duty cycle increments then decreasing them through one event period. Optionally, the slope of the ramps and curves may be adjusted by correspondingly varying the incremental duty cycle changes.

While only four types of waveforms are shown, and the waveforms are shown to be constant throughout each event period, any shape of waveform is possible and the shape of the waveform may be varied during any one or more of the event periods E, e.g. a ramp and sinusoidal waveform can be produced for one event period and then be succeed with a square and ramp waveform during the following event period. The haptic sensation produced the intensity and shape of the waveform can be manipulated in virtually any manner to alert seat occupants to different hazards and vehicle operating conditions. As such, the occupant can learn the sensations of particular events, conditions, etc. used to trigger the sensations so that future occurrences can be understood without having to display a corresponding visual indicator.

The foregoing relates to one of many methods that can be used to control the intensity of the haptic sensation in a liner or non-linear/time-varying manner. The present invention also contemplates controlling the frequency and duration of the equivalent signal 42 waveforms by adjusting the intensity, frequency, and duration of the carrier 48, e.g. the carrier signal 48 can experience high and low periods during the event period E. This may include simply varying the masking signal 48 while the carrier signal 46 is varied, i.e., intensity, frequency, and duration of both signals can be controlled.

One non-limiting aspect of the present invention relates to driving or otherwise controlling one or more haptic actuators. For exemplary purposes, the present invention is predominately described with respect to controlling a single motor based on conditions sensed by other vehicles systems or information gleaned from process data from various vehicle components. The present invention is not intended to be limited to imparting the same haptic sensation to all vehicle seats and fully contemplates simultaneously driving multiple haptic actuators with unique waveforms so that each vehicle occupant can be independently alerted with the same or different sensations as the other occupants.

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of imparting a haptic sensation using a haptic actuator included within a vehicle seat comprising:
   determining the haptic sensation to be imparted to the occupant;
   determining a waveform that corresponds to the determined haptic sensation;
   generating a first signal including a first duty cycle that corresponds with the determined waveform, the first duty cycle specifying a first frequency at which the first signal is alternated between high and low states;
   generating a second signal including a second duty cycle that corresponds with the determined waveform, the second duty cycle specifying a second frequency at which the second signal is alternated between high and low states;
   combining the first and second signals to produce a third signal that includes the determined waveform;
   determining the haptic sensation from information collected by one or more vehicle systems of a vehicle having the vehicle seat;
   increasing an intensity of the haptic sensation if the information indicates persistence of an event triggering a need to impart the haptic sensation;
   varying the second duty cycle and not the first duty cycle when increasing the intensity of the haptic sensation; and
   driving the haptic actuator with the third signal.

2. The method of claim 1 further comprising determining the haptic sensation to be of a first type when the information indicates a lane departure and to be of a second type when the information indicates a rear park obstruction.

3. The method of claim 2 further comprising using the same first duty cycle for both of the first and second types of haptic sensations.

* * * * *